Nov. 7, 1944.  W. RUDDOCK  2,362,407
EXCAVATING APPARATUS
Filed Oct. 24, 1942  2 Sheets-Sheet 1
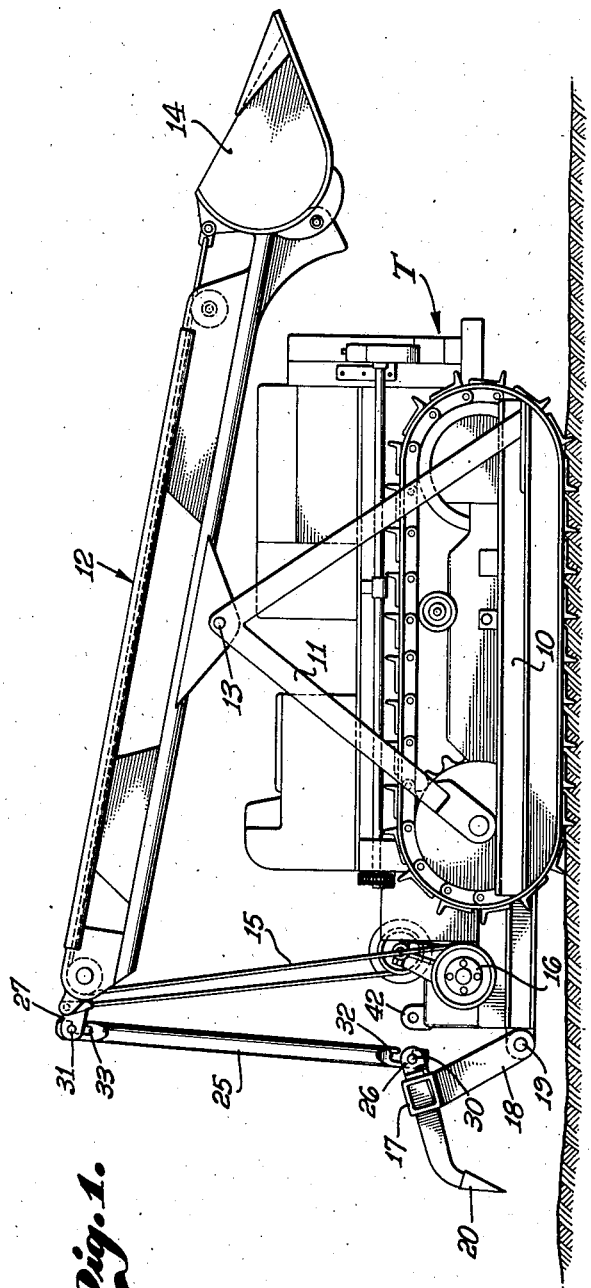
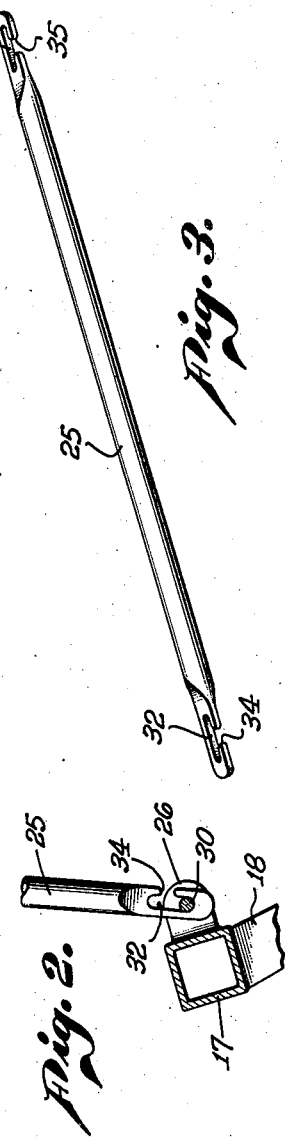
INVENTOR.
WILLIAM RUDDOCK,
BY
ATTORNEY.

Nov. 7, 1944.     W. RUDDOCK     2,362,407
EXCAVATING APPARATUS
Filed Oct. 24, 1942     2 Sheets-Sheet 2
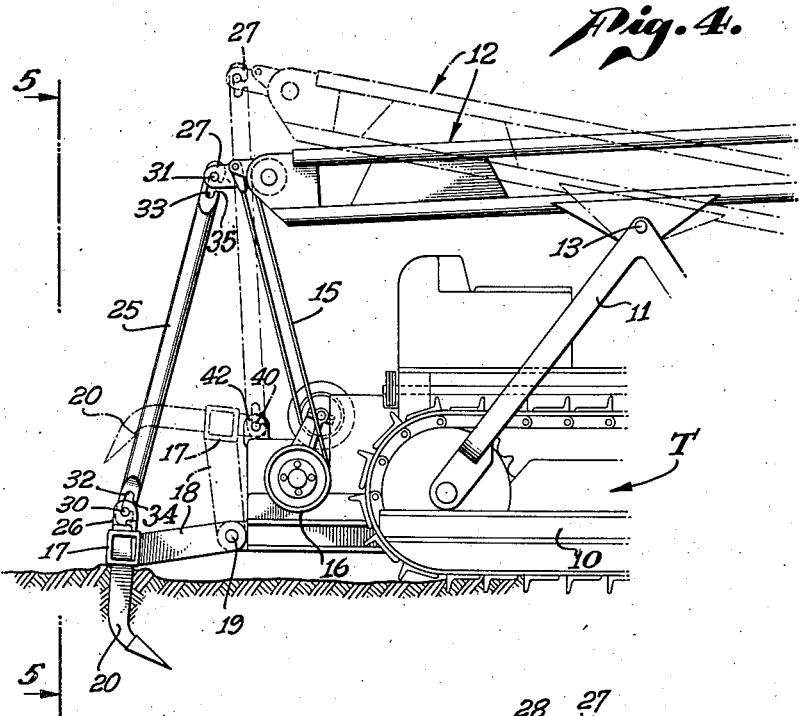
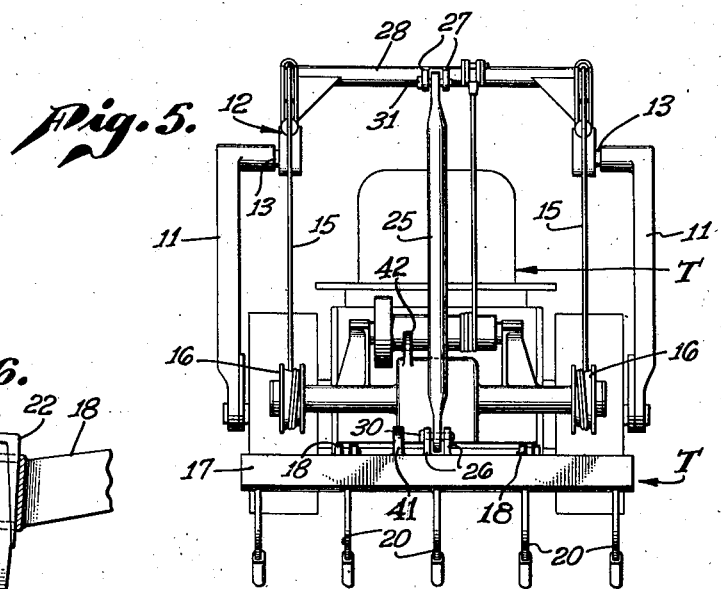
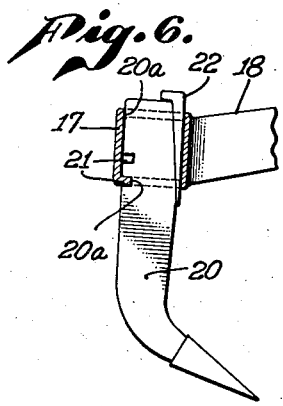
INVENTOR.
WILLIAM RUDDOCK,
BY
ATTORNEY.

Patented Nov. 7, 1944

2,362,407

UNITED STATES PATENT OFFICE 2,362,407

EXCAVATING APPARATUS

William Ruddock, South Pasadena, Calif., assignor of one-half to Marion P. McCaffrey, Los Angeles, Calif.

Application October 24, 1942, Serial No. 463,227

9 Claims. (Cl. 214—140)

This invention relates to scarifiers and analogous equipment for breaking up or loosening earth or other material being excavated.

In my application, Serial Number 418,557, filed November 10, 1941, I show and describe a shovel which is attached to a tractor and which is intended to lift and transport earth. Shovels of this type cannot of course be used in earth which is tightly packed, as the edge of the bucket will not penetrate if the ground is too hard. For this reason it has been customary to break up the earth in some fashion as a preliminary step to the handling of the earth or other material by the bucket.

In the past the earth has been broken up for handling by means of ploughs or scarifiers. These ploughs may be on a separate machine from the digging apparatus. There may be a frame carrying a large number of teeth which is dragged behind the tractor. Attempts have also been made to mount a scarifier on a tractor, which scarifier is caused to penetrate the earth by means of hydraulic mechanisms for exerting the necessary downward thrust on the movable part of the scarifier to force the teeth into the earth.

A separate machine carrying a scarifier is of course expensive and limited in its use. A scarifier mounted on an auxiliary device to be dragged behind a tractor is cheaper to build, but has the disadvantage that it cannot be used to scarify corners or in closely confined quarters, as it cannot be maneuvered as readily as a tractor by itself could be. Scarifiers which have been made as part of a tractor shovel employing hydraulic means to force the teeth of the scarifier into the earth and to hold them in the downward position are often excessively heavy in proportion to the function which they are to perform. Such excessive weight increases the wear and tear upon the tractor proper. Excessive weight also increases the power required to operate the entire device.

With the above disadvantages of prior types of scarifiers in mind it is a primary object of the present invention to mount a scarifier directly on the machine which carries the earth handling apparatus and to utilize the movement of part of said apparatus to operate the scarifier.

It is a further object of the present invention to provide a scarifier which is light in weight and which can be installed in a position where it will improve the balance of the machine as a whole.

It is a further object of the present invention to provide a scarifier which involves a minimum of added equipment to the tractor shovel.

It is a further object of the present invention to provide a scarifier which does not increase the complexity of operation of the machine to which it is applied.

It is a further object of the present invention to provide a scarifier which, when not in use will not interfere with the normal operation of the machine to which it is attached.

It is a further object of the present invention to provide a scarifier which is simple to connect to and disconnect from the machine upon which it is utilized.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detained description is not to be taken in a limiting sense, since the scope of the invention is best defined by the appended claims.

Referring to the drawings:

Figure 1 is a side elevation of a machine embodying one form of the present invention;

Figure 2 is an enlarged fragmentary section of a detail of the structure shown in Figure 1;

Figure 3 is an enlarged view of a connecting link employed in the structure of Figure 1;

Figure 4 is a fragmentary view of the structure of Figure 1, showing the parts in different positions of operation;

Figure 5 is a rear elevation of the structure, taken on line 5—5 of Figure 4; and, Figure 6 is an enlarged fragmentary view of a part of the structure of Figures 1 and 4.

The present invention involves the use of mobile earth handling apparatus of the type described in my above mentioned application. So far as the present invention is concerned, the chief characteristic which makes the above mentioned apparatus suitable for use with a scarifier is the existence of a boom or arm moving in a substantially vertical plane under the influence of mechanisms which are capable of moving the arm against considerable resistance. It is proposed to utilize the movement of this arm to operate a scarifier, that is, to move the scarifier from a position above the level of the ground into a digging position.

The apparatus upon which the present invention is utilized comprises a tractor T which is mounted upon treads for movement under the control of the operator. The tractor frame 10 carries a pair of spaced upright standards 11 between which an arm or boom 12 is pivotally mounted as at 13 for swinging movement through a vertical plane. This boom 12 carries a bucket 14 at one end thereof for handling earth. This arm is raised and lowered under the influence of a pair of cables 15 which are wound upon a winch 16 connected to the engine of the tractor through suitable gearing (not shown). In normal operation, the position of the arm 12 and the position of the bucket 14 is altered to enable the bucket 14 to pick up a load, transport it to a desired position and unload. It is obvious that the rearmost end of the arm moves upwardly and downwardly in response to operation of the winch 16. This movement is to be availed of to furnish the necessary power to operate a scarifier.

The scarifier proper comprises an elongated member 17 which extends across the rear end of the machine and serves as a mounting for the earth penetrating members. It may be of any suitable construction capable of withstanding the stresses imparted to it during the digging operation. However, in order to provide a convenient means for removably mounting the earth penetrating or ground breaking elements it is shown as being hollow and square in cross sectional configuration. The member 17 is mounted for movement toward and away from the earth by a pair of spaced arms 18 pivoted as at 19 to the tractor frame. The earth penetrating or ground breaking elements are in the form of teeth 20 which may be of any desired shape, and may be mounted on the transverse member 17 in any manner desired. They are shown as being more or less hook shaped to facilitate penetration and tearing of the earth. As shown clearest in Figure 6, the shank of each tooth passes through aligned slots 20a in opposed walls of the transverse member 17, and notches 21 in one edge of the tooth are engageable with the walls of the slots. A wedge 22 driven through the slots between the back of the tooth and a side wall of the member 17 serves to hold the tooth securely in place, while at the same time permitting its easy removal for sharpening or replacement. Adjustment of the teeth can be attained by the use of a plurality of notches along the edges of the teeth. The manner of mounting these teeth on the transverse member 17 is intended to be illustrative only, and any other suitable means may be employed. In fact there may be occasion to even weld the teeth on the member 17.

It can be seen that the operation of the scarifier involves the rotation of the member 17 about the pivots 19. In order to cause this rotation a connector bar 25 is provided which connects the rearmost end of the boom 12 to the scarifier so that downward movement of the rearmost end of the arm 12 moves the scarifier into a position in which the teeth 20 will penetrate the earth. A single connector bar has been found to be sufficient for this purpose. This bar is pivoted at its lower end to lugs 26 secured to the transverse member 17 and at its upper end to lugs 27 secured to a corresponding transverse member 28 on the rearmost end of the arm 12. These pivotal connections may be made by simply passing pins or bolts through the lugs and through the ends of the bar 25. However, as it is desired to remove and replace the member 25 rather frequent during operation of the machine, pivot pins 30 and 31 are permanently held in the respective lugs 26 and 27. The ends of the connector bar are provided with elongated slots 32 and 33 of sufficient width to slideably receive the pins 30 and 31, respectively. Transverse slots 34 and 35 are provided intermediate the ends of the respective slots 32 and 33 and are wide enough to permit entry of the pins 30 and 31.

In order to connect the scarifier to the boom 12 it is merely necessary to rest the lower end of the connector bar 25 against the pin 30 and slide it into a position in which the pin 30 enters the slot 32 through the slot 34. The upper end of the bar is placed against the pin 31 and the boom 12 raised or lowered until the pin 31 can enter the slot 33 through the transverse slot 35. When this has been done it can be seen that taking in the cables 15 by operation of the winch 16, will move the rearmost end of the boom downwardly and force the scarifier teeth into the ground. To raise the teeth out of the ground it is merely necessary to release the brake on the winch 16. The weight of the bucket on the forward end of the arm 12 will elevate the rearmost end of the arm 12 which will lift the scarifier.

When it is desired to use the machine in the normal manner for digging by means of the bucket 14, the scarifier can be swung upwardly to the position shown in light broken lines in Figure 4, and secured in this position by inserting a bolt or pin 40 through openings in the lugs 41 and 42 on the transverse member 17 and the tractor frame or body respectively. The bar 25 can then be readily removed by bringing its transverse slots 34 and 35 opposite the respective pins 30 and 31 and pulling outwardly on the bar. When the scarifier is in the retracted position it does not interfere in any manner with the operation of the machine as a shovel.

In addition to use as a scarifier, the member 17 may be used to support a single blade by means of the slots 20a in the transverse member 17. This blade can be moved upwardly and downwardly in exactly the same manner as the scarifier teeth, and thus the machine can be used for grading purposes in a manner analogous to a road scraper.

I claim:

1. In a material handling apparatus comprising a frame supported for movement over the ground, an arm mounted on said frame for movement in a substantially vertical plane, and means for moving said arm; earth engaging means, means supporting said earth engaging means for movement toward and away from the earth, and means optionally connecting said arm to said supporting means to move said earth engaging means into earth engaging position upon movement of said arm.

2. In a material handling apparatus comprising a frame supported for movement over the ground, an arm mounted on said frame for movement in a substantially vertical plane, and means for moving said arm; earth engaging means, means pivotally mounting said earth engaging means on said frame, and means optionally connecting said mounting means to said arm to move said earth engaging means upon movement of said arm.

3. In a material handling apparatus comprising a frame supported for movement over the ground, an arm movably mounted on said frame, and a winch and cable operatively connected to said arm to cause downward movement of one end of said arm upon taking in of said cable by said winch; earth engaging means, means supporting said earth engaging means, means pivotally mounting said supporting means on said frame for movement to bring said earth engaging means into earth engaging position, a detachable link optionally connecting said arm to said supporting means for transmitting movement of said arm to said supporting means, and means securing said supporting means against movement when said link is detached.

4. In a material handling apparatus comprising a frame supported for movement over the ground, an arm pivotally mounted on said frame for movement in a substantially vertical plane, a winch mounted on said frame, and a cable operatively connecting said arm with said winch to lower one end of said arm upon winding operation of said winch; a plurality of earth engaging elements, a member carrying said elements, means mounting said member on said frame for pivotal movement to bring said elements into earth engaging position, and a link pivotally connecting said arm to said member to transmit downward movement of one end of the arm to said member and move said elements into earth engaging position upon winding operation of said winch.

5. In a material handling apparatus comprising a frame supported for movement over the ground, an arm pivotally mounted intermediate its ends on said frame for rocking movement in a substantially vertical plane, and a bucket on one end of said arm for handling material; earth engaging means, means mounting said earth engaging means on the tractor frame for swinging movement toward and away from the earth, and means operatively connecting the end of the arm opposite the bucket to said mounting means to move said mounting means upon movement of said arm.

6. In a material handling apparatus comprising a frame supported for movement over the ground, an arm pivotally mounted intermediate its ends on said frame for rocking movement in a substantially vertical plane, and a bucket on one end of said arm for handling material; earth engaging means pivotally mounted on said frame for movement toward and away from the earth, and means operatively connecting the end of the arm opposite the bucket to said earth engaging means to move said earth engaging means into and out of engagement with the earth upon movement of said arm about its pivotal mounting.

7. A detachable link for optionally operatively connecting the dipper actuating mechanism of a material handling apparatus with an earth penetrating mechanism comprising, an elongated member having a longitudinal slot adjacent its end, said slot having closed ends, and means forming a transverse opening into said slot intermediate the ends of the slot.

8. In a material handling apparatus comprising a frame supported for movement in a forward and reverse direction over the ground, and a dipper supported by actuating mechanism on said frame and arranged to be optionally loaded by movement of said frame in one direction: means for breaking the ground in response to movement of said frame in said one direction and supported on said frame for movement toward and away from the ground, and means for operatively connecting said dipper actuating mechanism to said ground breaking means to move said means into ground engaging position upon operation of said mechanism.

9. In a material handling apparatus comprising a frame supported for movement in a forward and reverse direction over the ground, and a dipper supported in advance of said frame by actuating mechanism on said frame and arranged to be optionally loaded by forward movement of said frame: means for breaking the ground also in response to forward movement of the frame and carried by the rear of said frame for movement toward and away from the ground, and means for operatively connecting said dipper actuating mechanism to said ground breaking means to move said means into ground engaging position upon operation of said mechanism.

WILLIAM RUDDOCK.